(12) United States Patent
Sempliner et al.

(10) Patent No.: US 8,049,109 B2
(45) Date of Patent: *Nov. 1, 2011

(54) GROMMET FOR CABLES

(75) Inventors: Arthur T. Sempliner, Douglaston, NY (US); Berkeley T. Merchant, Santa Fe, NM (US)

(73) Assignee: Upsite Technologies, Inc, Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/392,174

(22) Filed: Feb. 25, 2009

(65) Prior Publication Data

US 2009/0151983 A1 Jun. 18, 2009

Related U.S. Application Data

(62) Division of application No. 11/865,269, filed on Oct. 1, 2007, now Pat. No. 7,507,912.

(51) Int. Cl.
*H02G 3/22* (2006.01)

(52) U.S. Cl. ............... 174/153 G; 174/152 G; 174/650; 174/152 R; 16/2.1; 16/2.2; 248/56

(58) Field of Classification Search ............ 174/650, 174/152 G, 153 G, 152 R, 135, 659, 151; 248/56; 16/2.1, 2.2; 439/604, 587, 274, 439/275; 277/55, 355; 52/27, 198, 204.1, 52/73, 199, 19, 192, 273, 220.1, 503, 454, 52/220.7; 49/365; 160/19; D8/356

See application file for complete search history.

(56) References Cited

U.S. PATENT DOCUMENTS

| | | |
|---|---|---|
| 945,753 A | 1/1910 | Chamberlain et al. |
| 1,490,252 A | 4/1924 | Bissell |
| 3,434,273 A | 3/1969 | Lovell |
| 3,042,739 A | 7/1972 | Craig |
| 3,778,529 A | 12/1973 | Miller |
| D236,204 S | 8/1975 | Cooper |
| 4,099,020 A | 7/1978 | Kohaut |
| D268,895 S | 5/1983 | Beleckis |
| 4,465,288 A | 8/1984 | Kofoed, Sr. |
| 4,520,976 A | 6/1985 | Cournoyer et al. |
| 4,678,075 A | 7/1987 | Bowman, Jr. |
| D292,391 S | 10/1987 | Schlesch |
| D298,494 S | 11/1988 | Mockett |
| 4,905,428 A | 3/1990 | Sykes |
| 5,041,698 A | 8/1991 | Takagi et al. |
| 5,101,079 A | 3/1992 | Rodrigues et al. |

(Continued)

OTHER PUBLICATIONS

Doug Mockett & Company, Inc., 1997 "New Concepts Supplement" (3 pages).

(Continued)

*Primary Examiner* — Angel R Estrada
(74) *Attorney, Agent, or Firm* — St. Onge Steward Johnston & Reens LLC

(57) ABSTRACT

A cable grommet system for installation in data centers, offices and the like, for sealing cable openings in raised flooring, wall or ceiling panels, server cabinets, etc. to facilitate the installation and revision of wiring and cabling to server installations while minimizing losses of any provided conditioned air. A wide variety of grommet configurations is possible with a limited number of component parts. An advantageous acute angle mounting of sealing brushes enhances the sealing effectiveness thereof, particularly for smaller sizes of cable openings. In some embodiments, a novel arrangement of electrical conductors is incorporated into the grommet structures for dissipation of electrostatic charges, enabling the basic frame components to be formed of a flame retardant material.

9 Claims, 8 Drawing Sheets

U.S. PATENT DOCUMENTS

| | | | |
|---|---|---|---|
| 5,195,288 A | 3/1993 | Penczak | |
| 5,392,571 A | 2/1995 | Greenfield | |
| 5,429,467 A | 7/1995 | Gugle et al. | |
| 5,440,841 A | 8/1995 | Greenfield | |
| 5,467,947 A | 11/1995 | Quilling, II | |
| 5,518,115 A | 5/1996 | Latulippe | |
| 5,594,209 A | 1/1997 | Nattel et al. | |
| 5,628,157 A | 5/1997 | Chen | |
| 5,630,300 A | 5/1997 | Chen | |
| 5,727,351 A | 3/1998 | Neathery et al. | |
| 5,793,566 A | 8/1998 | Scura et al. | |
| 5,813,243 A | 9/1998 | Johnson et al. | |
| 5,994,644 A | 11/1999 | Rindoks et al. | |
| 6,102,229 A | 8/2000 | Moncourtois | |
| 6,149,164 A | 11/2000 | Kreutz | |
| 6,255,597 B1 | 7/2001 | Bowling et al. | |
| 6,265,670 B1 | 7/2001 | Duesterhoeft et al. | |
| 6,278,061 B1 | 8/2001 | Daoud | |
| 6,291,774 B1 | 9/2001 | Williams | |
| 6,316,725 B1 | 11/2001 | Cole et al. | |
| 6,430,882 B1 | 8/2002 | Feldpausch et al. | |
| 6,462,277 B1 | 10/2002 | Young et al. | |
| D469,410 S | 1/2003 | Lyon | |
| D472,325 S | 3/2003 | Walker | |
| 6,557,831 B2 | 5/2003 | Erwin | |
| 6,632,999 B2 | 10/2003 | Sempliner et al. | |
| 6,848,226 B1 | 2/2005 | Boyd et al. | |
| 7,126,059 B2 | 10/2006 | Dinh et al. | |
| D571,641 S | 6/2008 | Sempliner et al. | |
| 7,507,912 B1 * | 3/2009 | Sempliner et al. | 174/153 G |

OTHER PUBLICATIONS

Mockett, Catalog No. 20, "New Concepts 2002" (3 pages).
"Wire Management," Mockett.com (5 pages), undated.
Woertz AG, Quotation dated Feb. 8, 2005 (4 pages).
Denco Technologies with notation "Edition 2001" (3 pages).
Planchers Comey undated pamphlet "Office Automation 2 Movable Raised Floor" (4 pages with two attached photo enlargements).
Internet print of Forte B&B—Vertriebs—und Warenhandels GmbH, undated (2 pages).
Internet print of Uniflaireurope, undated, with photo enlargement.

\* cited by examiner

GROMMET FOR CABLES

RELATED APPLICATION

This is a divisional of U.S. patent application Ser. No. 11/865,269, filed Oct. 1, 2007, now U.S. Pat. No. 7,507,912.

BACKGROUND OF THE INVENTION

This invention relates to a cable grommet system, particularly for use in connection with data centers, offices and the like to accommodate the passage of cables from one side to another of a floor, cabinet, rack, or other enclosure serving as a containment between two areas, particularly where the areas are under unequal air pressure, such as for conditioned air (heating or cooling) under positive pressure. The term "cable", as used herein, refers not only to flexible electrical wires and cables but also to rigid elements, such as pipes, conduits and the like that may be extended through openings in floor or other panels, especially where it is desired to restrict the flow of air through such openings.

In data centers and the like, large numbers of computer servers typically are arranged in a compact configuration of cabinets or racks. Large numbers of the cabinets or racks may be housed in a common area, to facilitate access to the servers by technicians for wiring and rewiring, servicing, etc. Commonly in such installations, a raised floor structure is provided, creating a space under the floor for the passage of the necessary wiring and cabling to power the servers and to transmit the input and output signals therefrom. The wiring and cabling for a particular server rack is extended through the space below the floor, and is passed upward through the floor to enable connection with the servers, typically, but not necessarily, at the back of the rack.

Modern high speed servers generate significant heat during operation, and this heat must be dissipated effectively in order to avoid damage to and/or malfunction of the servers. Accordingly, it is customary to provide an air conditioned environment for the servers, typically by providing the conditioned air under pressure (e.g., 0.1 inch of water) in the space provided underneath the raised flooring. Outlets for the conditioned air are located at each of the server cabinets or racks, typically at the front thereof, such that the cooled air may flow upward along the front of the cabinet rack and be drawn into and passed through the individual servers from front to back.

Openings provided in the flooring for the passage of cable can result in the undesired flow of some of the cooling air through the cable openings. The leakage of cooling air through such openings can represent a significant economic loss, because cooling air that simply mingles with the general atmosphere of the data center, and does not flow properly to intake openings at the front of the servers, does not function effectively to cool the servers and its cooling effort is simply lost. In a typical large data center, there can be large numbers of such cable openings (for example, as many as sixty openings per thousand square feet of floor space). Collectively, this can represent a significant loss of cooling capacity, if conditioned air is allowed to escape through these openings.

Heretofore, various efforts have been made to seal off these openings. However, because the cabling of data centers is very dynamic, in the sense that the server setups, and the cabling for servicing them, are constantly changing, many sealing concepts that would otherwise be suitable for wiring and cabling are not suitable for use in dynamically changing data centers and the like.

A significant advance in the design of cable grommets for data centers and the like is reflected in the Sempliner et al. U.S. Pat. No. 6,632,999, which discloses and claims a particularly advantageous form of cable grommet comprising a frame, suitable for fitting into a cable opening in a floor, cabinet or other pressurized space, and provided with a unique arrangement of one or more brush-like sealing elements comprising a large plurality of filamentary elements forming a substantial seal of the opening in the grommet frame. The arrangement enables cables and the like to be easily passed through the filament-sealed opening, such that frequent wiring and rewiring is greatly facilitated. After the wires and cables are passed through the grommet opening, the opening is automatically effectively sealed by the multitude of filaments which deflect and close around the cable elements. The cable grommet of the Sempliner et al. '999 patent has been very successful commercially and has achieved very significant economies in the operation of data centers, and even in less densely wired areas, such as offices, for example.

SUMMARY OF INVENTION

The present invention is directed to a new and improved cable grommet which readily accommodates a wide variety of sizes and shapes of cable openings utilizing a standardized set of component elements. Pursuant to one aspect of the invention, a cable grommet of closed configuration can be formed utilizing a pair of grommet-forming end units of generally U-shaped configuration, or using a pair of such U-shaped units together with one or more pairs of extension units between the U-shaped units, or using a pair of opposed extension elements of suitable length to fill the entire opening. A pair of such U-shaped end units, joined with their open sides facing each other, define a grommet of closed configuration. Operative cable grommets may also be provided using a single U-shaped end unit arranged with its open end suitably closed or confined, as by an edge or surface of an adjacent panel, an element of a rack or cabinet, or by other means. In other configurations, extension units corresponding in cross section to side sections of the U-shaped grommet-forming end units, are mounted in substantial alignment and contact with the side sections of a primary U-shaped end unit, effectively extending its length. An elongated grommet of closed configuration may comprise a pair of opposed, U-shaped end units, optionally with one or more pairs of the extension units, depending on requirements.

According to one aspect of the invention, the side sections of the U-shaped grommet-forming end units are formed with channels for reception of brushes provided with cantilever mounted bristles. The brushes are mounted at an acute angle of about 30 degrees to a plane defined by peripheral mounting flanges of the end units. A pair of brushes extend from opposite sides of the end unit and meet mid-way to provide effective sealing against significant air leakage from one side of the brush pair to the other, while readily accommodating the easy passage and removal of cabling. By mounting the brushes at an angle of around 30 degrees, the effectiveness of the brushes is enhanced, and the effective length of the brushes may be increased within a grommet opening of a given width. In the illustrated and preferred embodiments of the invention, the brush filaments extend upwardly from their cantilever mountings. However, in appropriate cases the brush filaments could be extended downward at an acute angle.

In accordance with another feature of the invention, the grommet-forming end units and extension units advantageously are formed of a flame retardant plastic material. Heretofore, such flame retardant materials have not been widely used, because they tend to lack conductivity, which is important for dissipating static electric charges developed in and around the brush elements and around the cabling passing through the brush elements. In accordance with the invention, a conductive element is incorporated into each of the U-shaped end units, arranged so that a portion thereof underlies a mounting flange and other portions thereof have contact with a conductive backing structure of the brushes. The arrangement is such that static charges developed on the cables or brushes are effectively dissipated into the flooring or other panel in which the grommet is installed, which panels typically are formed of a conductive material, such as metal.

The invention provides for a versatile set of grommet-forming components that can be manufactured and installed on an economical and flexible basis to enable data centers and the like to operate with a desired high level of cooling efficiency. The grommet system of the invention, while particularly advantageous for use in high density data centers, can also be employed to great advantage in other venues, such as offices incorporating raised flooring structures for the passage of wires and cables and, in many cases also forming an enclosure for HVAC air.

For a more complete understanding of the above and other features and advantages of the invention, reference should be made to the following detailed description of preferred embodiments, and to the accompanying drawings.

DESCRIPTION OF A PREFERRED EMBODIMENT

Figure 1:
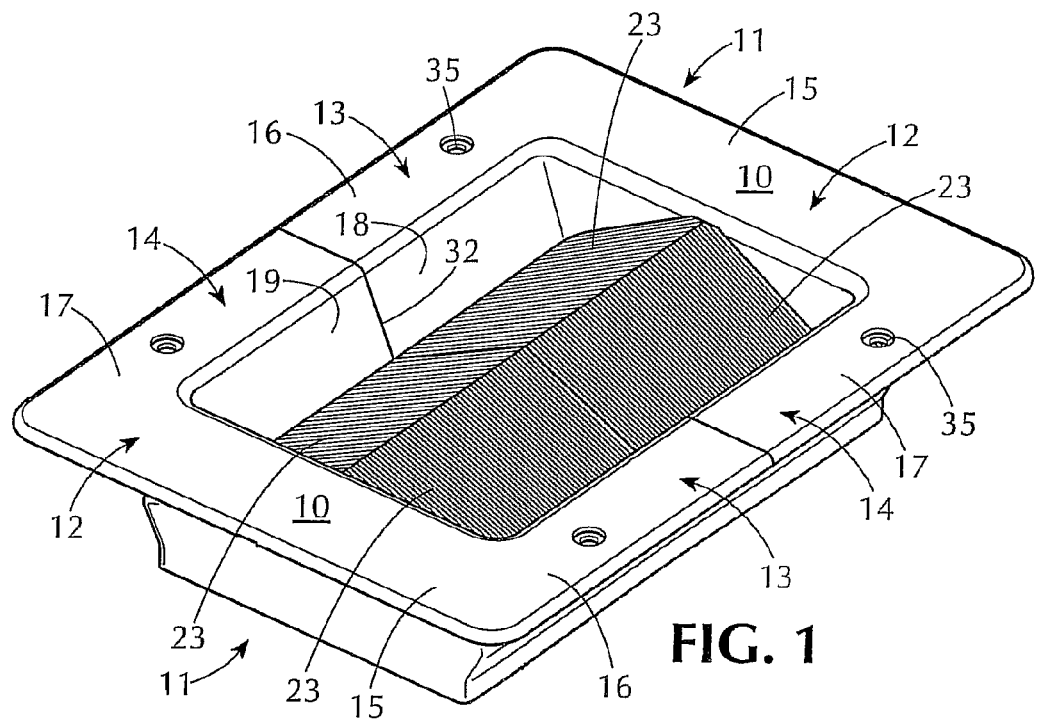
FIG. 1 is a perspective view from above of a cable grommet system of closed configuration comprised of two U-shaped grommet-forming end units according to the invention.

Referring now to the drawings, the reference numeral 10 designates generally a basic grommet-forming end unit according to the invention. The end unit comprises a frame 11 of generally U-shaped configuration, comprising an end section 12 and spaced-apart, opposed side sections 13, 14. The entire frame, consisting of the sections 12-14, advantageously is a unitary molding of structural plastic material, and particularly a plastic material having fire retardant characteristics. A preferred form of such material, for example, is available from GE Plastics, under their trademark "CYCOLAC", and particularly Cycolac Resin FR23. This product is a flame retardant ABS, which is desirable for the purposes of this invention.

The end and side sections 12-14 of the end unit 10 are formed with laterally extending flanges 15-17, which define a flat plane and provide means for supporting and securing the end unit 10 on a panel (not shown) having an opening therein. The panel most typically is a floor panel, but may be any form of panel defining an enclosure, such as a wall panel, a panel of an enclosure cabinet, rack, or the like, where openings are provided for the passage of cables, and it is desired to prevent the uncontrolled flow of air through such opening.

Figure 5:
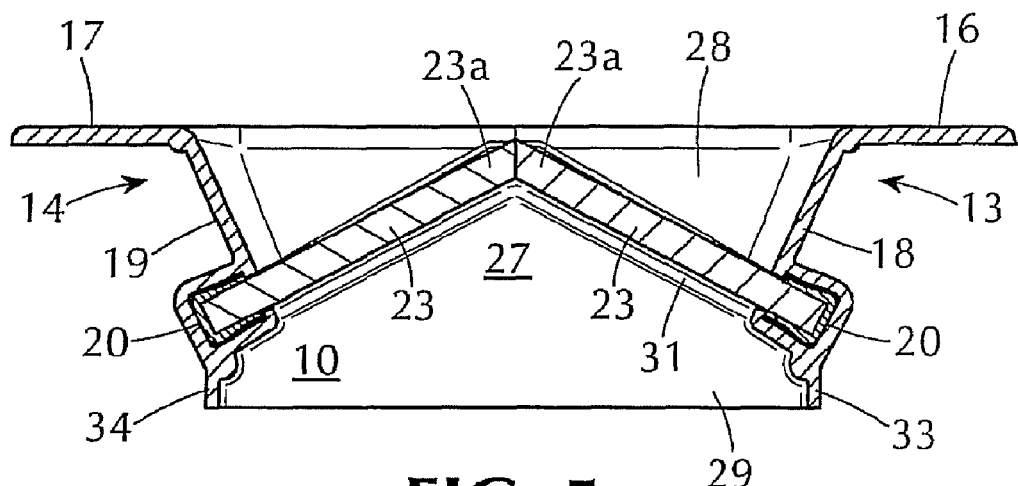
FIG. 5 is a cross sectional view as taken generally on line 5-5 of FIG. 3.
Figure 6:
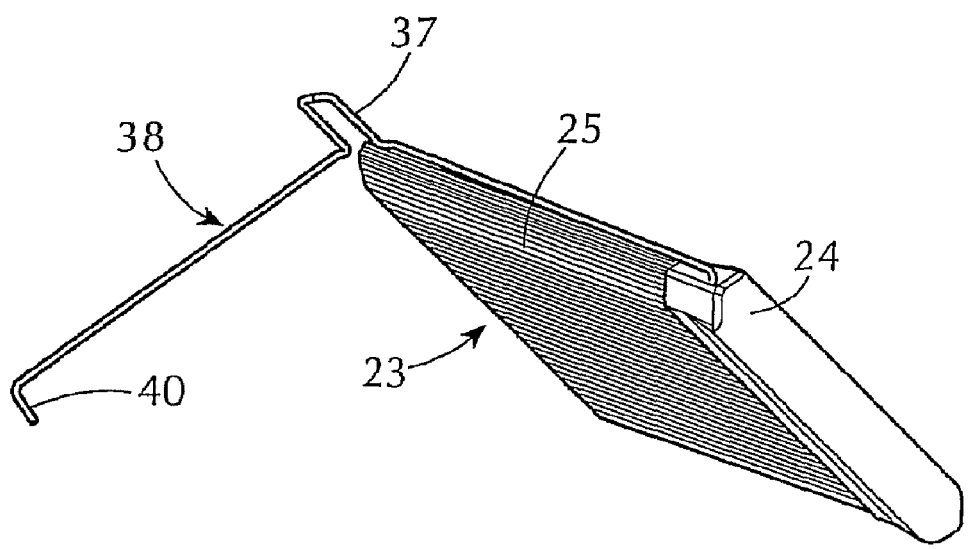
FIG. 6 is a perspective view of an electrically conductive contact element utilized in the grommet system of the invention, illustrating its relation to a brush installed in the grommet frame.
Figure 7:
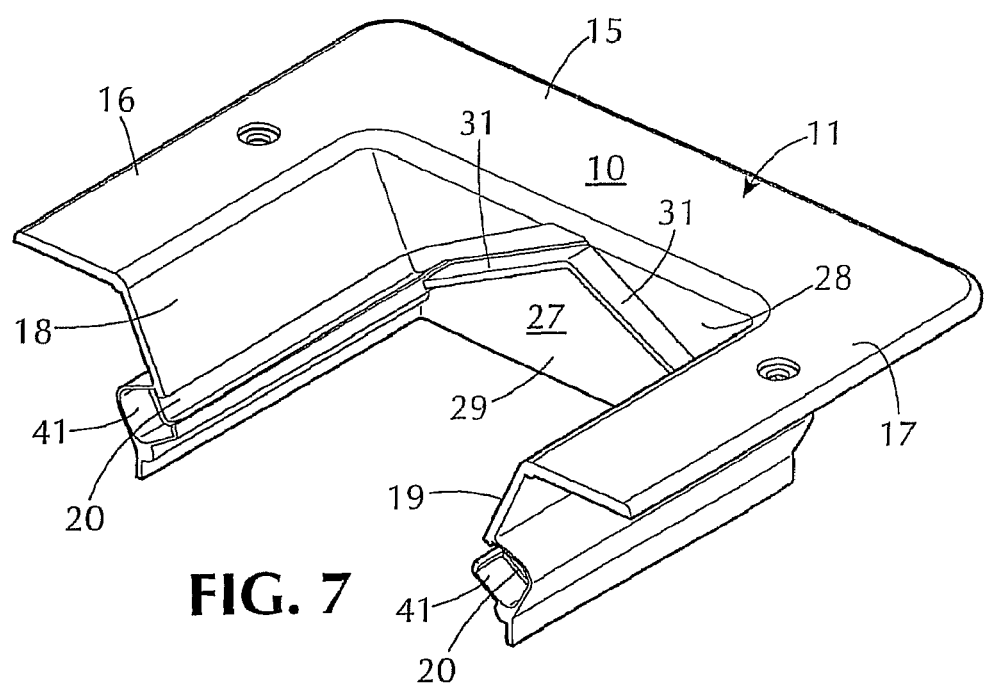
FIG. 7 is a perspective view from above of a U-shaped grommet frame according to the invention.
Figure 8:
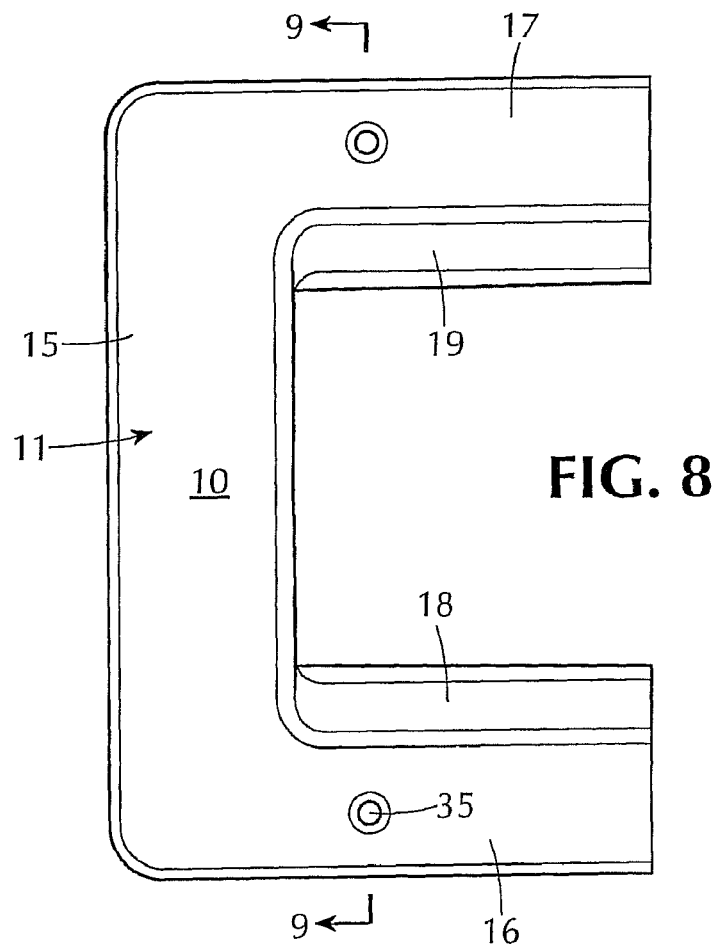
FIG. 8 is a top plan view of the grommet frame of FIG. 7.
Figure 9:
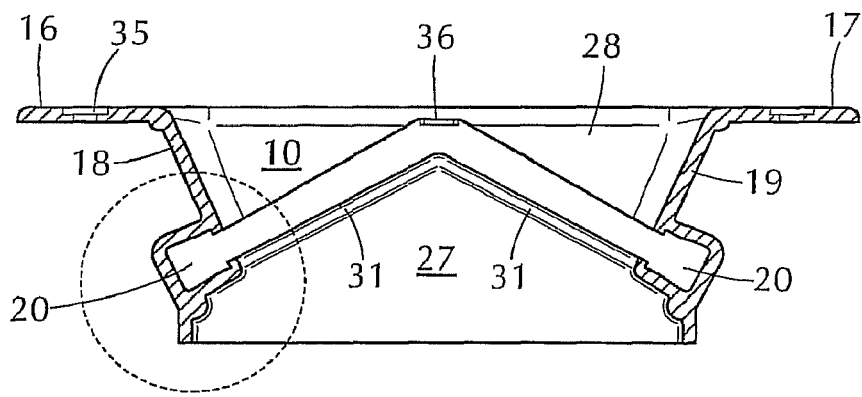
FIG. 9 is a cross sectional view taken generally on line 9-9 of FIG. 8.
Figure 10:
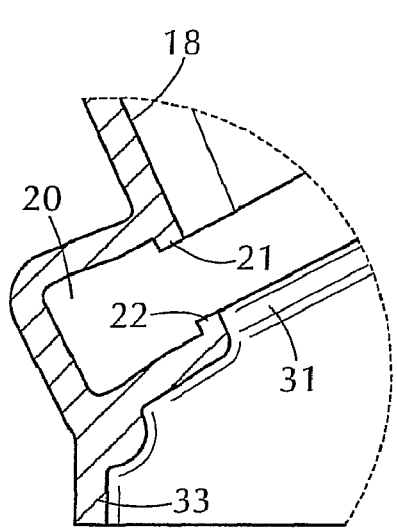
FIG. 10 is an enlargement of a portion of the cross section of FIG. 9.

As shown in FIG. 5, the respective side sections 13, 14 include side walls 18, 19 angling downward and inward from the side flanges 16, 17 at an angle of about 60 degrees to the plane defined by the flanges 15-17. At the base of each of the side walls 18, 19, there is a channel 20, shown in detail in FIG. 10. The channel 20 extends along the full length of the walls 18, 19 and preferably is formed with inwardly projecting flanges 21, 22 at its open side, extending along the length of the channel, which serve to restrict the channel opening in the manner reflected in FIG. 10. The channels 20 are adapted to receive and mount first and second brush elements 23. As shown in FIG. 6, the brush elements 23 comprise a rigid backing 24 mounting a plurality of flexible bristles 25 in cantilever fashion. To advantage, the backing 24 is formed by a conductive strip to provide electrical continuity from the bristles 25. The bristles themselves advantageously are provided with an electro conductive coating material so as to be able to conduct away any static charges that might develop between the bristles and cable elements passing therethrough.

To advantage, the brush elements 23 are inserted longitudinally in the channels 20 such that the backing 24 and conductive strip of the brush elements are engaged by the channel side walls, and retained in the channel by the restricting flanges 21, 22. In the illustrated and preferred form of the invention, the brush elements 23, which are in generally flat configuration as shown in FIGS. 5 and 6, are disposed generally at right angles to the side walls 18, 19, such that the brush elements are disposed at an acute angle of about 30 degrees with respect to the plane of the flanges. The length of the bristles is such that the free outer end portions 23a of an opposed pair of brushes meet generally along the longitudinal center line of the end unit 10. In the illustrated arrangement, the outer ends of the bristles are arranged at an angle such that the opposed bristle ends meet substantially along a vertical plane. Typically, the bristle ends will at least slightly overlap, such that there is positive contact between the bristle ends of an opposed pair of brush units, to assure that they will form a proper seal between them and also that there will be good conductivity between the brush units to facilitate dissipation of static charges. In some cases, it may be acceptable, or even desirable, to utilize brush elements with bristles that are all of substantially the same length such that the free end portions of the brushes are squared off, whereby the lower bristles or one brush overlap significantly and intermingle with lower bristles from the opposing brush element.

Figure 4:
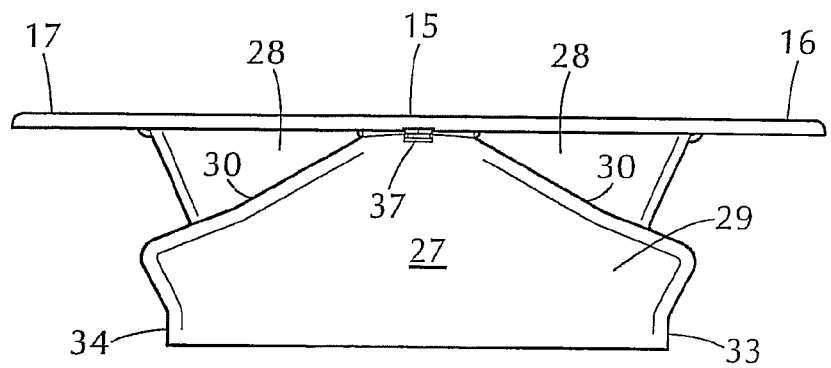

In the illustrated and preferred form of the invention, the end section 12 is provided with an end wall structure 27 consisting of upper end wall portions 28 and a lower end wall portion 29, with the lower end wall portion 29 being offset longitudinally outward from the upper end wall portions 28 and joined thereto by inclined walls 30 (FIG. 4) extending outwardly from the upper end wall portions 28. When the brush elements 23 are inserted longitudinally into their mounting channels 20, the side edges of the brushes adjacent the end wall structures 27 are arranged to underlie the inclined walls 30, to assure good sealing between the brushes and the ends of the U-shaped frame 11. The end wall portion 29 may also advantageously be provided with inwardly projecting flanges 31 positioned to underlie side edge portions of the brushes 23 to provide additional support for the brush elements and to enhance the sealing action at the closed end of the frame 11. The length of the brush elements 23, measured along the backing 24, is such that, when the brush elements are fully inserted into the channels 20, and the side edges of the brushes at the closed end of the frame are seated underneath the inclined wall 30, the side edges of the brushes at the open end of the frame 11 are aligned with the end edges 32 of the frame side sections 13, 14.

In the illustrated form of the invention, the side sections 13, 14 may be provided with downwardly extending skirt walls 33, 34, which extend downward from lower corner areas of the channels 20 for a short distance. The lower end wall 29 likewise can extend downward a corresponding distance, so that the lower edges of the side and end walls define a common plane parallel to the flange plane. The walls 33, 34 and 29 also define a lower bottom opening for the grommet end unit 10. When desired, all or part of the skirt walls 33, 34 may be eliminated.

Pursuant to one aspect of the invention, a single grommet-forming end unit 10 can be used by itself to form a functioning cable grommet in a floor or other panel, as where a cable opening is formed immediately adjacent a wall or panel which serves to close the open side of the U-shaped end unit. For example, cable openings frequently are formed in floor panels immediately adjacent another panel or to a vertical wall, or in a vertical (cabinet or wall) panel adjacent to a floor panel, and in such cases a single, U-shaped grommet-forming end unit 10 can form a suitable cable grommet by itself.

Figure 2:
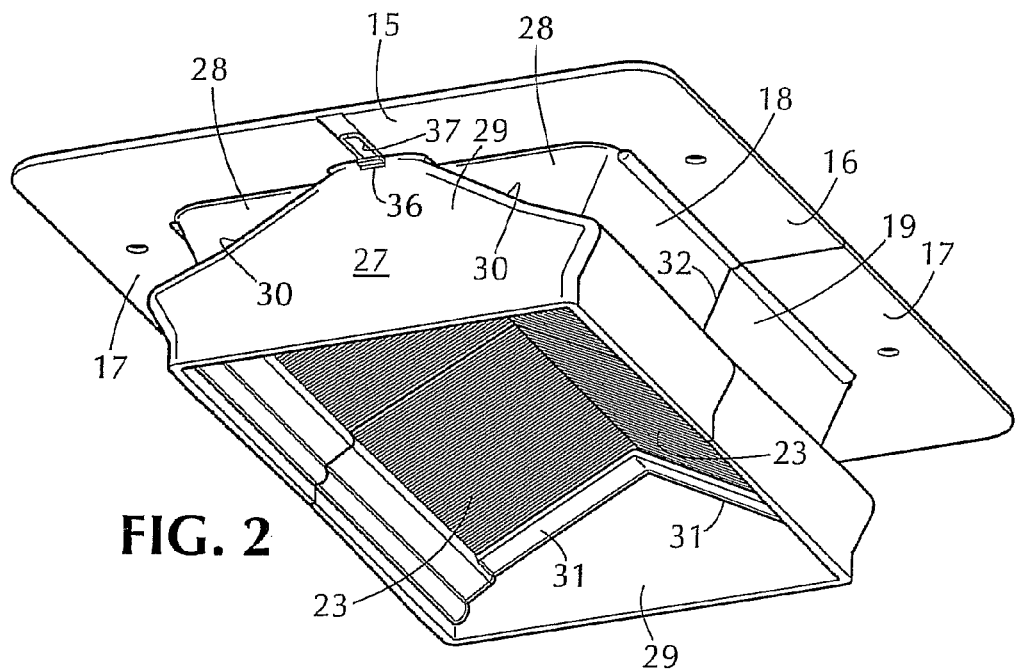
FIG. 2 is a perspective view from the bottom of the grommet structure of FIG. 1.
Figure 3:
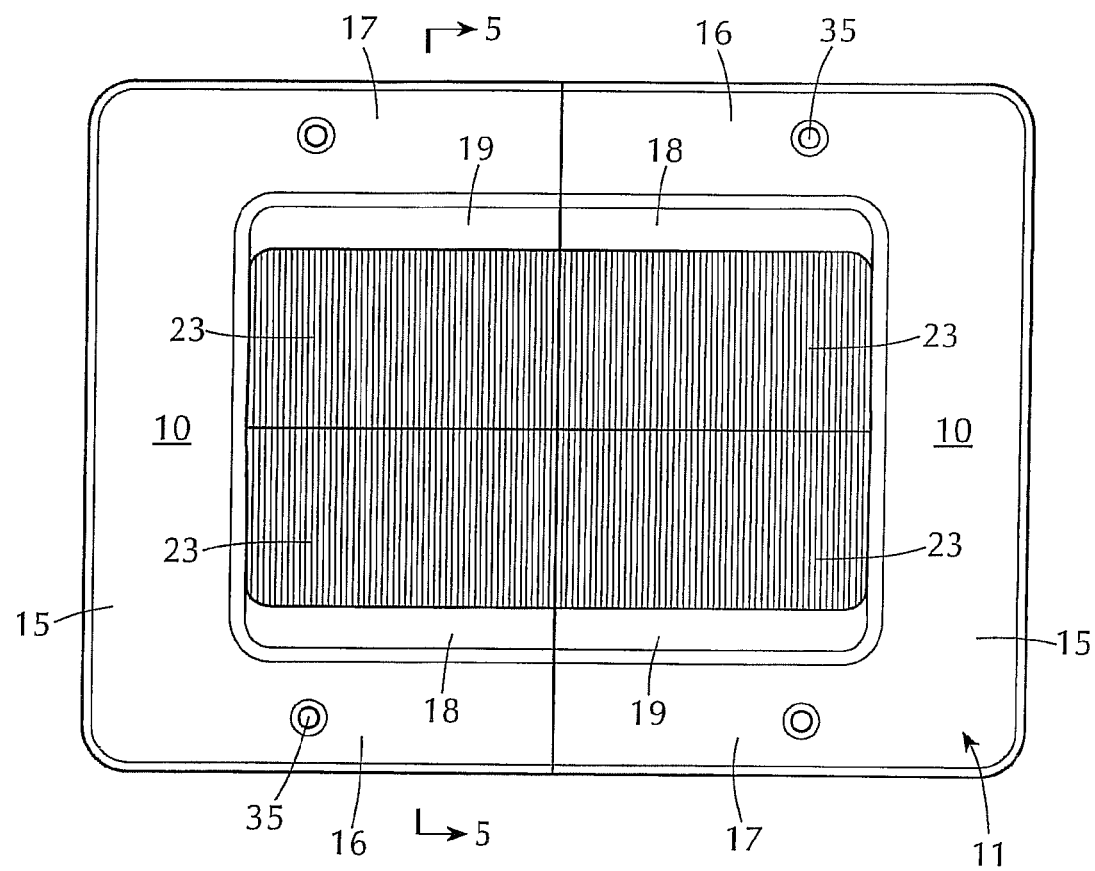
FIGS. 3 and 4 are top plan and end elevational views respectively of the grommet structure of FIG. 1.

More typically, a pair of grommet-forming end units 10 are arranged open-end-to-open-end, as shown in FIGS. 1-3 to form a two-unit cable grommet of closed configuration. Where the closed grommet configuration is employed, it is unnecessary to provide for the physical joining of one end unit 10 to the other. More preferably, and more economically, the two units are simply placed together end-to-end within an opening in a panel member, in the configuration shown in FIGS. 1-3. The individual grommet-forming end units 10 are then secured individually to the panel, by screws or other fasteners inserted through suitable openings 35 provided in the side flanges 16, 17. The units 10 are thus fixed in proper alignment as a result of being fastened to the surface of the panel.

Although the grommet-forming end units 10 can be of any size, the invention lends itself particularly well to utilization in connection with relatively small cable openings. For example, the two-unit configuration as shown in FIGS. 1-3 is ideally suited for cable openings of approximately 4×6 inches in size. Advantages are derived from disposing opposed pairs of brush elements 23 at an upwardly (or downwardly) inclined acute angle, as shown, particularly in connection with grommets of smaller size. The angular relation of the opposing brushes allows for better closure of the bristles around the cable elements passing therethrough. Additionally, for a given opening, the angularly disposed bristles can be of somewhat greater length, which further enhances the sealing action thereof.

Figure 12:
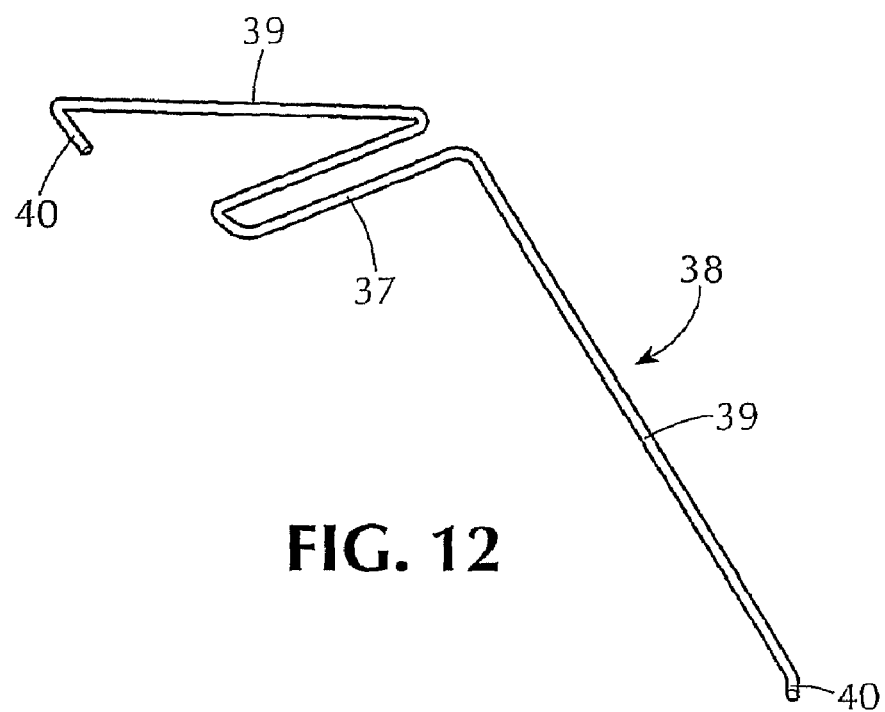
FIG. 12 is a perspective view of a contact element to be incorporated in the grommet structure for dissipating electrical charges from the brushes.
Figure 13:
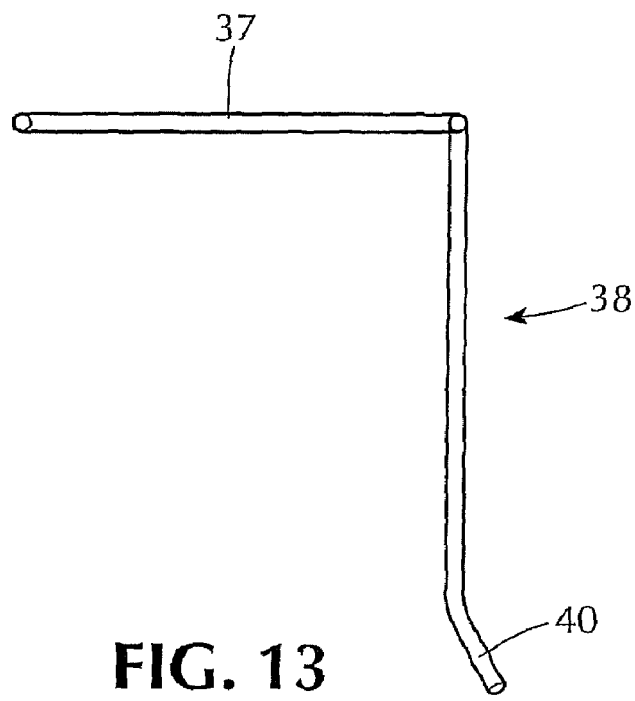
FIG. 13 is a side elevational view of the contact element of FIG. 12.

As heretofore mentioned, the desirable plastic material used in the formation of the frame 11 has a significant fire retardant characteristic. At the same time, the electric conductivity of such material is very low. Accordingly, the cable grommet of the invention incorporates a simplified yet highly effective arrangement for conducting away static electrical charges that may develop on the cables or on the bristles of the brush elements 23. To this end, each of the frames 11 is provided in the upper extremity of its outer end wall structure 27 with a small opening 36 for the reception of a projecting portion 37 of a conductor 38 (FIG. 6, 12-13). The conductor 38 includes two angularly disposed elements 39 arranged at an angle of about 120 degrees, each carrying an angular tip portion 40 at its outer end. When the conductor 38 element is installed, its projecting portion 37 is passed through the wall opening 36 and extends longitudinally outward, partly received in a recess 15a in the underside of the end flange 15, as best shown in FIG. 2. The angularly disposed elements 39 extend laterally outward and downward, on the inside of the end wall structure 29, substantially in alignment with the planes of the brush elements 23. When the brush elements are inserted longitudinally in their channels 20 and pushed to the full depth thereof to engage the end wall portion 29, the innermost ends of the conductive backings 24, engage the ends 40 of the conductors 38 to establish electrical contact. When the grommet-forming end unit 10 is installed on a conductive panel, the projecting portion 37 is pressed into contact with the panel, to establish the desired electrical contact. The arrangement is such that any electrostatic charges developed on the cables and brushes are conducted away via the surrounding conductive backing 24 and the conductors 38 into the flooring or other paneling on which the unit is installed.

Figure 11:
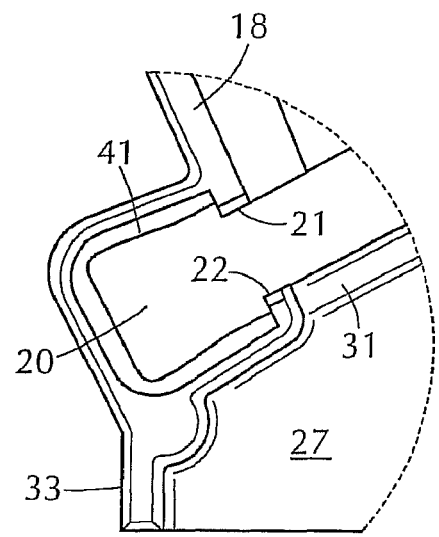
FIG. 11 is a view, similar to FIG. 10, but illustrating a channel end portion of the grommet frame of FIG. 7.
Figure 14:
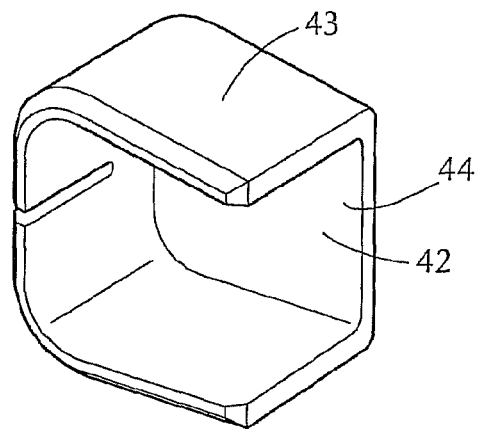
FIG. 14 is a perspective view of an end cap element optionally used to cover exposed ends of the brushes installed in the grommet frames.

In some cases, and particularly where a cable grommet is to be formed using a single grommet-forming end unit 10, it may be desirable to dress the open outer ends of the brush-receiving channels 20. To this end, the open outer ends of the channels 20 are enlarged slightly, as indicated at 41 in FIG. 11. This enlargement may extend inward for a short distance, providing a small clearance space surrounding the outer end surfaces of the backing of a brush element 23 installed in the channel. A molded plastic end cap element 42, shown in FIG. 14, has outer walls 43 shaped and sized to fit within the enlarged area 41 surrounding outer portions of the brush backing. This portion of the end cap is inserted into the enlarged open end of the channel 20 and is tightly held therein by friction and/or adhesive. An end wall 44 of the cap covers the exposed end of the brush element and provides a neater appearing unit.

Figure 16:
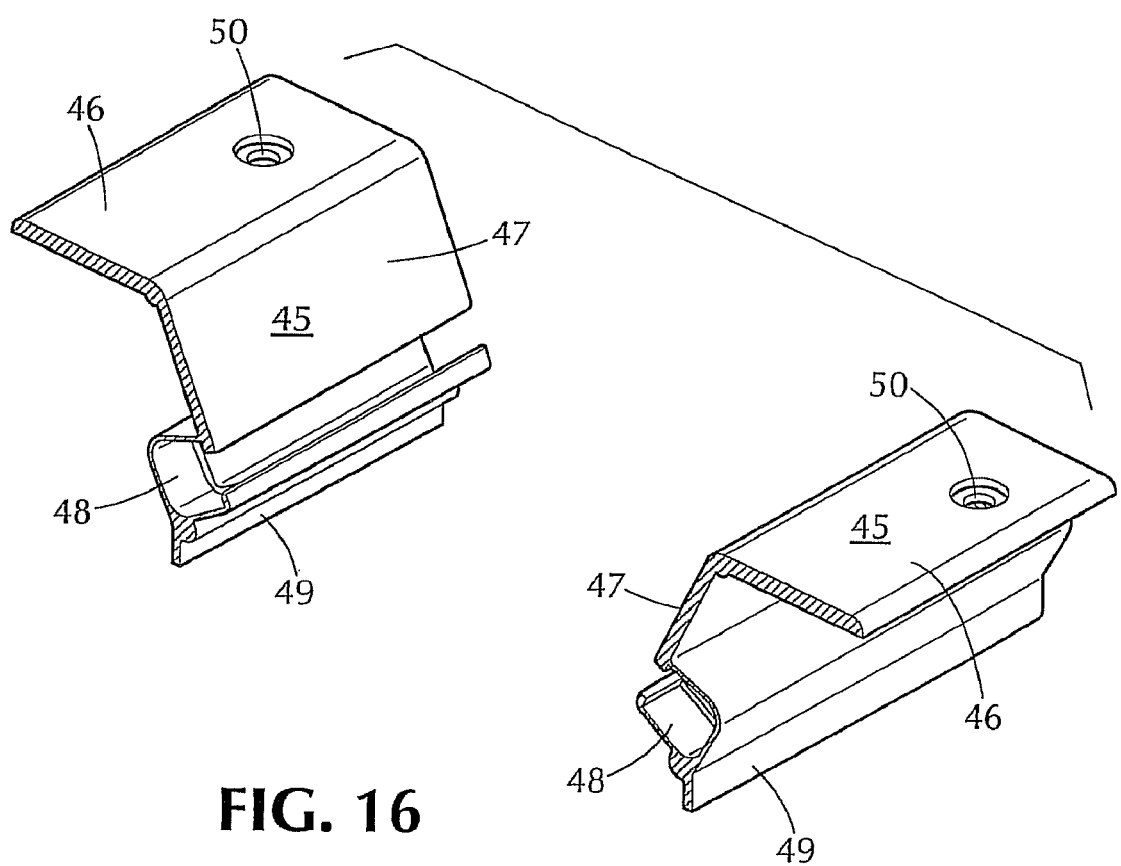
FIG. 16 is a cross sectional view as taken generally along lines 16-16 of FIG. 15 illustrating in perspective view details of construction of the extension units shown in FIG. 15.

In accordance with one of the features of the invention, the cable grommet may be configured to be installed in cable openings of greater length than could be dressed and covered by one or two of the grommet-forming end units 10. To this end, special side extension units 45 (FIG. 16) are positioned between two end units 10. These side extension units are substantially identical in cross sectional configuration to the respective side sections 13, 14 of a grommet-forming end unit 10, being provided with laterally extending flanges 46, downwardly and inwardly angled side walls 47, brush retaining channels 48, depending bottom wall sections 49 and openings 50 in the flanges 46 for the reception of fasteners. The side extension units 45 normally are utilized in pairs and advantageously, although not necessarily, are of a length equal to the longitudinal (length) dimension of a standard brush element 23, measured along its backing 24. If desired, of course, the side extension units may be of greater or lesser length than that of a standard brush element, in which case longer or shorter brush elements could be utilized. In any case, the side extension units generally will be used in pairs of the same length.

Figure 15:
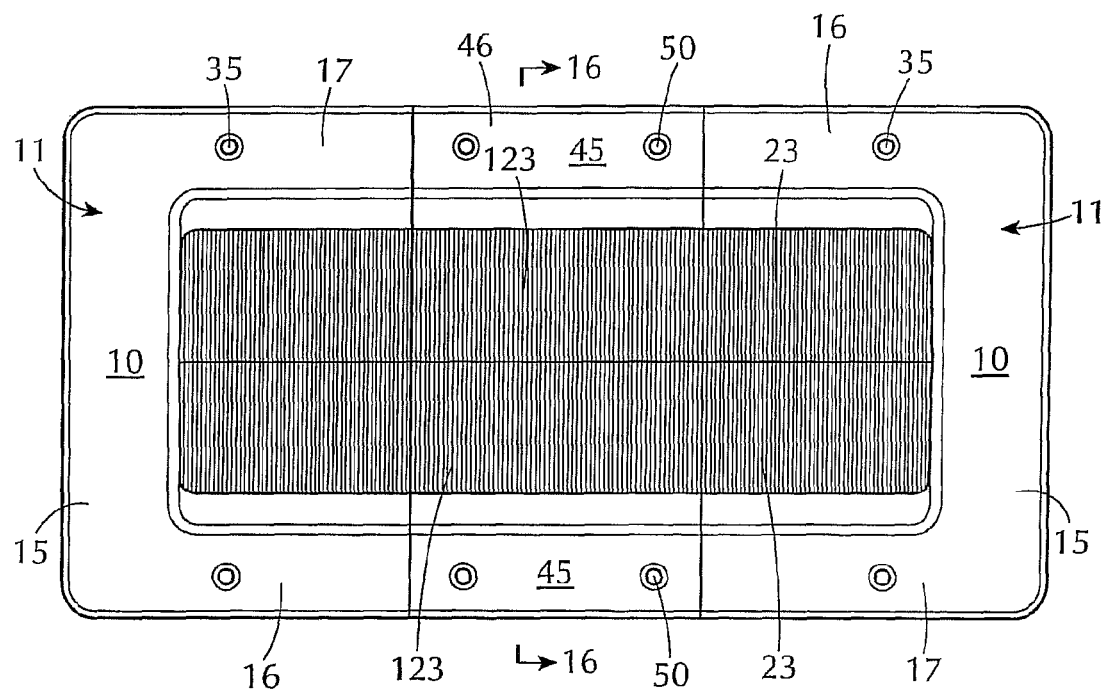
FIG. 15 is a top plan view of a grommet of closed configuration, incorporating a pair of U-shaped end units of the type shown in FIGS. 1-3 and, in addition, a pair of extension units optionally used for assembling elongated grommets for cable openings of greater length.

As reflected in FIG. 15, a four-unit cable grommet may be assembled utilizing a pair of grommet-forming end units 10 in spaced-apart relation, bridged by a pair of side extension units 45 mounting brush elements 123. In the illustration of FIG. 15, the brush elements 123 are of the identical construction to the brush elements 23 in the adjacent end units 10. However, in the side extension units 45, the entire brush 123 is visible, whereas in the end units 10, inner end portions of the brushes 23 are received under the inclined end walls 30 and are not visible from above the assembled grommet.

In the four-unit, extended grommet of FIG. 15, none of the sections 10, 45 are joined directly together. Instead, they are secured in assembled relation, as shown in FIG. 15, by being secured to a surrounding panel (not shown) by fasteners received in the openings 35, 50. As will be readily appreciated, the length of the assembly 15 may be extended to any desired dimension, by simply adding additional pairs of the side extension units 45 or, if appropriate, modifying one or both of the units 10, 45.

The invention provides a uniquely advantageous, highly flexible cable grommet arrangement which, with a simplified set of component parts can be assembled in a wide variety of lengths. The system requires only three standardized parts, the basic grommet-forming end unit 10 of U-shaped configuration, the side extension unit 45, and the brushes 23 (123). With those three component parts, many different sizes of cable grommets may be installed, from a single grommet-forming end unit 10 positioned against a confronting panel, to a more conventional grommet comprising two of the U-shaped standard end units installed open-end-to-open-end, to an elongated unit as suggested in FIG. 15, incorporating a pair of the standard end units 10 and one or more pairs of the side extension units 45. Additionally, in appropriate cases, a grommet assembly may be constructed using one or more pairs of individual extension units 45 arranged in opposing relation, with panel edges at opposite ends of the extension units serving to close the ends of the grommet structure. In such cases, the opening to be dressed and closed will be of the same length as one or more pairs of the side extension units 45, so that the entire area of the opening is closed by brushes 123 of the extension units.

The angular disposition of the sealing brushes, in relation to the plane of the mounting flanges 15-17 or 46, optimizes their sealing characteristics, particularly for smaller cable openings, where bristles of somewhat greater length in relation to the size of the cable opening may be accommodated.

By providing for the direct conductivity from the brush elements to a panel on which the grommet is mounted, it becomes feasible to form the molded plastic grommet frame elements of a flame retardant material, which is considered of great significance in modern data centers in which large numbers of servers may be concentrated.

While a significant use of the grommet of the invention is in connection with floor openings in data centers and the like, the grommet has widespread usage elsewhere in data centers and also in office buildings. In data centers, the grommets can be used to great advantage in connection with openings formed in the cabinets and racks housing servers, in order to maximize the cooling efficiency of conditioned air provided to those cabinets and racks. Additionally, it is becoming increasingly common in office buildings to provide raised floor arrangements, with wiring and cabling being routed in the space under the raised flooring. The grommet configurations of the invention are ideally suited for such applications, which may or may not involve conditioned air.

The grommet system of the invention is uniquely advantageous with respect to the ability to be configured to an unusually large variety of grommet arrangements using three basic elements, the U-shaped end elements, the side extensions and the brush elements. Accordingly, product costs and inventory costs are minimized while allowing a substantial variety of configurations to be assembled to suit the requirements of the end user.

It should be understood, of course, that the specific forms of the invention herein illustrated and described are intended to be representative only, as certain changes may be made therein without departing from the clear teachings of the disclosure. In the claims, and throughout the specification, the term "cable" shall be interpreted to mean not only ordinary flexible electrical cable comprising one or more electrical conductors within an insulating cover, but shall include other elements, including rigid elements such as conduit or pipe and may be extended through an opening in a floor or other panel. Likewise, a grommet according to the invention may be installed in a floor panel, wall or ceiling panel, cabinet wall or the like, where its features and functions may be used to advantage. Accordingly, reference should be made to the following appended claims in determining the full scope of the invention.

We claim:

1. A cable grommet system for providing cable access through a floor or wall panel separating two areas, which comprises
   (a) a frame structure comprising separate and independent opposed side sections, of a straight configuration and of substantially uniform cross section, arranged to extend through an opening in said panel,
   (b) said opposed side sections including side walls and integral mounting flanges for supporting said side sections on said floor or wall panel and said mounting flanges being secured in a fixed arrangement to respective opposite sides of said opening,
   (c) said flanges defining a plane, and
   (d) a pair of brushes having first ends and being mounted in cantilever fashion from side walls of said opposed side sections and extending toward each other at a substantial acute angle to said plane, and having second ends meeting midway between said side walls to form an effective air seal.

2. A cable grommet system according to claim 1, wherein
   (a) said acute angle is about 30°.

3. A cable grommet system according to claim 1, wherein
   (a) said side sections include opposed channels extending along said side walls, said channels being disposed generally parallel to said plane and being positioned in spaced-below relation to said flanges, for reception of the first ends of said brushes, and
   (b) said channels have at least one open end and a partially restricted open side, whereby said brushes are installed in said channels by longitudinal insertion from open end channels.

4. A cable grommet system according to claim 1, wherein
   (a) said side sections are disposed at an angle of about 90° to the brushes mounted therein.

5. A cable grommet system according to claim 1, wherein
(a) said first ends of said brushes are mounted in said side walls at a level substantially spaced from a level at which the second ends of said brushes meet.

6. A cable grommet system for providing cable access through a floor or wall panel separating two areas, which comprises
(a) a frame structure comprising separate and independent opposed side sections, of a straight configuration and of substantially uniform cross section, arranged to extend through an opening in said panel,
(b) said opposed side sections including side walls and integral mounting flanges for supporting said side sections on said floor or wall panel and said mounting flanges being secured in a fixed arrangement to respective opposite sides of said opening,
(c) said flanges defining a plane, and
(d) a pair of sealing elements having first ends mounted in cantilever fashion from side walls of said opposed side sections and extending toward each other at a substantial acute angle to said plane, and meeting midway between said side walls to form an effective air seal.

7. A cable grommet system according to claim 6, wherein
(a) said acute angle is about 30°.

8. A cable grommet system according to claim 6, wherein
(a) said side sections are disposed at an angle of about 90° to the sealing elements mounted therein.

9. A cable grommet system according to claim 6, wherein
(a) said first ends of said sealing elements are mounted in said side walls at a level substantially spaced from a level at which the second ends of said sealing elements meet.

* * * * *